United States Patent
Elumalai et al.

(10) Patent No.: US 11,558,740 B2
(45) Date of Patent: Jan. 17, 2023

(54) DYNAMIC ENCRYPTION FOR SCHEDULED MESSAGE DELIVERY

(71) Applicant: T-Mobile USA, Inc., Bellevue, WA (US)

(72) Inventors: Anbalagan Elumalai, Bellevue, WA (US); Sudhanshu Pandey, Sammamish, WA (US)

(73) Assignee: T-MOBILE USA, INC.

( * ) Notice: Subject to any disclaimer, the term of this patent is extended or adjusted under 35 U.S.C. 154(b) by 126 days.

(21) Appl. No.: 17/029,214

(22) Filed: Sep. 23, 2020

(65) Prior Publication Data
US 2022/0095101 A1    Mar. 24, 2022

(51) Int. Cl.
*H04W 4/12*      (2009.01)
*H04W 12/033*    (2021.01)
*H04W 12/61*     (2021.01)

(52) U.S. Cl.
CPC ........... *H04W 12/033* (2021.01); *H04W 4/12* (2013.01); *H04W 12/61* (2021.01)

(58) Field of Classification Search
CPC ...... H04W 4/12; H04W 12/61; H04W 12/033
USPC ......................................................... 713/162
See application file for complete search history.

(56) References Cited

U.S. PATENT DOCUMENTS

| | | | |
|---|---|---|---|
| 8,872,940 B2 * | 10/2014 | Marman | H04N 9/7921 348/231.3 |
| 2005/0091487 A1 * | 4/2005 | Cross | G06F 21/10 713/193 |
| 2006/0031674 A1 * | 2/2006 | Sakurai | H04L 9/088 713/166 |
| 2007/0087791 A1 * | 4/2007 | Feeney | G06Q 10/109 455/567 |
| 2010/0058476 A1 * | 3/2010 | Isoda | G06F 21/6227 713/165 |
| 2010/0268936 A1 * | 10/2010 | Matsushima | G06F 21/62 713/153 |
| 2015/0326692 A1 * | 11/2015 | Kaneko | H04L 63/10 709/217 |
| 2017/0054670 A1 * | 2/2017 | Lee | H04L 51/24 |
| 2017/0076752 A1 * | 3/2017 | Steward | H04N 21/854 |
| 2021/0044573 A1 * | 2/2021 | Chauhan | H04L 63/0428 |

* cited by examiner

*Primary Examiner* — Josnel Jeudy
(74) *Attorney, Agent, or Firm* — Summit Patents PC (57) ABSTRACT

Techniques and architectures enable a wireless communications system to receive and transmit a message for which a user of a mobile device has specified to be delivered on a particular date and time to a contact in an address book of the user. Further, the network securely stores the message by encrypting the message with a strength of encryption that is based on the length of time that the message will be stored before its scheduled delivery.

20 Claims, 6 Drawing Sheets

DYNAMIC ENCRYPTION FOR SCHEDULED MESSAGE DELIVERY

BACKGROUND

Short Message Service (SMS) allows users to exchange text messages between capable mobile phones and other devices within a wireless communications network. Generally, text messages are sent to an SMS Center (SMSC). The wireless communications network may include multiple SMSCs to manage the receipt, storage, and forwarding of text messages.

SMS may feature message delivery confirmation so that the sender can receive a return message notifying them whether the message has been delivered. SMS messages may be sent and received simultaneously with Global System for Mobile Communications (GSM) voice, data, and fax calls. This is possible because SMS messages are sent using a signaling path and not a dedicated radio channel.

Multimedia Messaging Service (MMS) allows users to exchange multimedia communications between capable mobile phones and other devices. MMS is an extension of the SMS protocol and defines a way to send and receive messages that include images, audio, and video in addition to text.

SMS, MMS, and other messaging services may benefit from improved security measures that protect contents and integrity of messages before, during, or after their delivery.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques and architectures for enabling a wireless communications system to receive and transmit messages, such as text messages (e.g., Short Message Service or SMS), for which a sender has specified to be delivered on a particular date and time to a receiver. Further, such techniques and architectures may allow for the system to securely store the messages by encrypting the messages with a strength of encryption that is based on the length of time that the message will be stored before its scheduled delivery. For example, generally, the longer a message is stored, the greater its exposure to security risks. Accordingly, a message to be stored for a relatively long time may be strongly encrypted. On the other hand, strength of encryption of a message is generally proportional to the amount of memory the encrypted message occupies. Thus, security of stored messages may be balanced with a burden that the stored messages have on system storage. For instance, a message to be stored for a day generally has little exposure to security risks, so it may be low-strength encrypted and therefore occupy relatively little storage memory. On the other hand, a message to be stored for a year has higher exposure to security risks, so it may be high-strength encrypted and therefore occupy greater storage memory. Managers of wireless communications systems may determine their desired balance between memory storage costs versus security risks.

A scheduled message (e.g., a message scheduled for delivery) may be generated on a remote client device. For example, a user of the device, interacting with an application, may create a message and select a date or time for when the message is to be delivered to one or more recipients. The user may generate the scheduled message to be delivered, for example, minutes, hours, days, weeks, months, or years later. Subsequently, the scheduled message may be stored by a network, such as that of a wireless communications system, for a time span corresponding to the delivery schedule (e.g., the amount of time a message is stored before its delivery to the recipient). Herein, such a time span is called "storage time." Thus, for example, a scheduled message to be delivered three months after its generation may have a storage time of three months.

In various embodiments, encryption of a scheduled message is performed by a wireless communications system. Specifically, one or more portions of the wireless communications system may perform the encryption, independently of the remote client device that generated the scheduled message. In some situations, however, an application residing on a remote client device (e.g., a mobile device) may be considered to be part of a wireless communications system. For example, such an application may be at least partially managed by the wireless communications system, which may provide various parameters to the application. The parameters may be provided from time to time or in response to the generation of a scheduled message, for example. The parameters may be, for instance, encryption strength variables that are tabulated with storage times. In other words, a wireless communications system may transmit, to a mobile device, instructions regarding the strength of encryption as a function of storage times based on delivery schedules.

In other embodiments, encryption of a scheduled message is performed by a remote client device, independently of a wireless communications system. For example, an application residing on the remote client device may perform the encryption of a scheduled message. The encrypted scheduled message may then be transmitted to a wireless communications system where the message is stored until the scheduled delivery time. Herein, the word "remote" indicates a substantial physical distance between what is remote and interacting entities, such as a server or other component(s) of a wireless communications network.

Encryption strength may be described in terms of the size of keys used to perform the encryption. Generally, longer keys provide stronger encryption. Key length may be measured in bits. Encryption strength may be measured as the number of bits in the key used to encrypt data corresponding to a message. Generally, the larger the number, the larger the amount of memory needed to store the encrypted data and the longer the computing time needed to decrypt the data.

The strength of encryption is related to the difficulty of discovering the key, which in turn depends on both the cipher used and the length of the key. For example, the difficulty of discovering the key for the RSA (Rivest-Shamir-Adleman) cipher often used for public-key encryption depends on the difficulty of factoring large numbers, a well-known mathematical problem.

Generally, asymmetric encryption, such as ElGamal, RSA, and elliptic curve techniques (ECC), is used in day-to-day communication channels. Asymmetrical encryption, also known as public key cryptography, uses two keys to encrypt a message. Encryption and decryption keys are different but related. The encryption key is known as the public key and the decryption key is known as the private key. The public and private keys are known as a key pair. An unpredictable (typically large and random) number may be used to begin generation of an acceptable pair of keys suitable for use by an asymmetric key algorithm. In an asymmetric key encryption scheme, anyone can encrypt messages using the public key, but only the holder of the paired private key can decrypt. Security depends on the secrecy of the private key.

As mentioned above, different encryption techniques and strengths generally involve different memory sizes for storage, different memory sizes for implementation of the encryption (and decryption) process, and different execution times for the encryption (and decryption) process. The memory requirement may depend on the number of operations to be done by the algorithm of the encryption (and decryption) process, key size used, initialization vectors used, and type of operations. The memory used, considering the enormous number of messages typically processed by a wireless communications system, strongly impacts costs of the system. Accordingly, management of the system may involve balancing these costs with a desired measure of security for stored scheduled messages waiting to be delivered.

Figure 1:
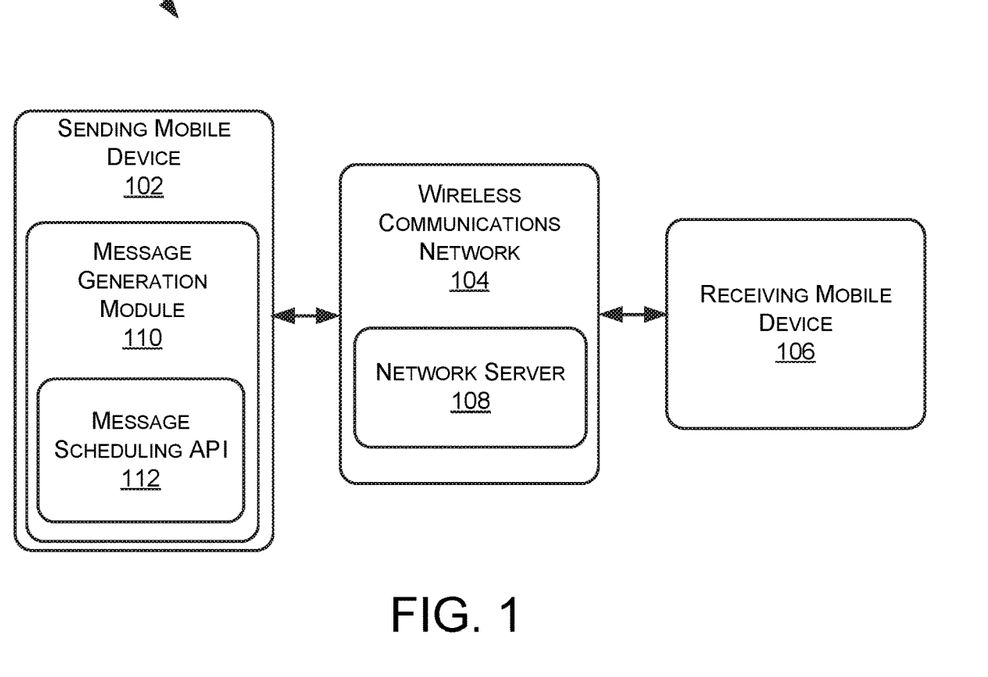
FIG. 1 is a block diagram of a system for scheduled message delivery, according to various embodiments.

FIG. 1 is a block diagram of a system 100 for scheduled message delivery, according to various embodiments. Sending mobile device 102 may be a remote or wireless device, such as a client device of a wireless communications network 104, for example, and is identified as such in FIG. 1, though claimed subject matter is not so limited. The identifier "sending" for 102 signifies that, in this example, 102 is the mobile device that is generating and transmitting a message to be received (at a scheduled time) by a receiving mobile device 106. Communication between sending mobile device 102 and receiving mobile device 106 may be implemented by a network server 108, which may comprise one or more servers in wireless communications network 104. Sending mobile device 102 may include a message generation module 110, which may be software, hardware, or a combination thereof Sending mobile device 102 may include a message scheduling application programming interface (API) 112 that provides for a user of sending mobile device 102 to create and schedule a message for delivery to receiving mobile device 106. In some embodiments, message generation module 110 may perform or manage encryption of messages created on sending mobile device 102. As described in detail below, message scheduling API 112 may provide a number of options to the user of device 102, such as desired message delivery time, request for message delivery receipt, and selection of one or more recipients of the message, just to name a few examples. Receiving mobile device 106 need not include components such as a message generation module or message scheduling API but is assumed to be capable of receiving messages.

Sending mobile device 102 may be associated with a telecommunications service provider, such as wireless communications network 104, and may have a profile associated with a subscriber identity module (SIM) card of the mobile device that indicates associated subscriber account information or a communication address associated with the telecommunications service provider.

In detail, telecommunication devices, such as sending mobile device 102 and receiving mobile device 106, may be associated with SIM cards that store personal information of respective customers. A SIM card may be a portable memory chip or an embedded memory chip (eSIM). A SIM card associated with a telecommunication device can include data associated with a phone number of a customer associated with the telecommunication device, an address book of the client (e.g., customer), text messages sent and received via the telecommunication device, and other data. Generally, when a customer opens a service account associated with a telecommunication service provider, the telecommunication service provider can activate a SIM card of a telecommunication device associated with the service account of the consumer. That is, each SIM card includes a unique number on the memory chip requiring activation by the telecommunication service provider (e.g., via a website associated with the telecommunication service provider, via a call to the telecommunication service provider, etc.).

Figure 2:
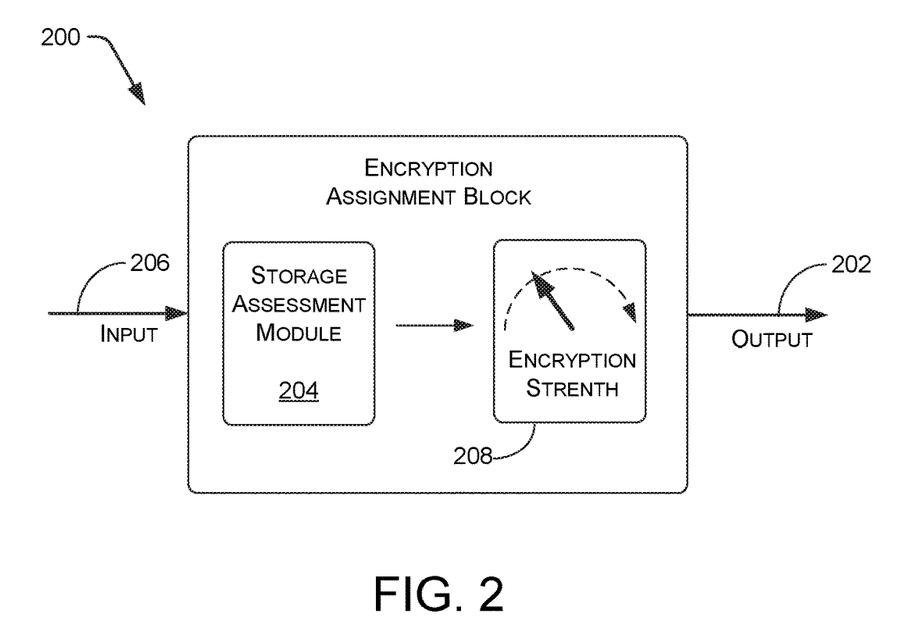
FIG. 2 schematically illustrates an encryption process for a scheduled message, according to some embodiments.

Embedded SIM (eSIM) cards are a relatively new generation of SIM cards that are embedded in devices, such as telecommunication devices. eSIM cards can have multiple applications, one which supports over the air provisioning of a profile which identifies the device in which the eSIM card is embedded to a telecommunications service provider. Currently, GSMA offers an eSIM remote provisioning specification which enables a profile on an eSIM card to be changed remotely without having to change the eSIM card itself FIG. 2 is a schematic representation of an encryption assignment block (EAB) 200, according to various example embodiments. EAB 200 performs at least a portion of an encryption process for a scheduled message. For example, in some implementations, EAB 200 may make determinations, described below, and, based on these determinations, provide an output 202 comprising instructions for applying encryption to the scheduled message. Encryption may be performed by sending mobile device 102 or by wireless communications network 104. In other implementations, EAB 200 may make the determinations described below and, based on these determinations, perform the encryption process for the scheduled message. In these implementations, output 202 may comprise the encrypted scheduled message.

EAB 200, which may reside in sending mobile device 102 or in wireless communications network 104, determines the type or strength of encryption to be applied to a scheduled message. For example, EAB 200 includes a storage assessment module (SAM) 204 that receives input 206 comprising a scheduled message or metadata representing the scheduled message. Such metadata may include the size of the message and storage time resulting from the time and date for when the scheduled message is to be delivered, for example. Based, at least in part, on input 206, SAM 204 may determine requirements or necessary allocations of memory for storing the scheduled message. In other words, SAM 204 may determine memory costs based, at least in part, on storage time for the scheduled message.

Block 208 represents an ability of EAB 200 to, for individual scheduled messages, dynamically vary the encryption (or strength thereof) applied to the scheduled messages. As discussed above, the encryption may be varied based, at least in part, on the storage time of the scheduled messages. In some implementations, EAB 200 may vary the encryption based on other factors that may be determined or considered by SAM 204. Accordingly, these factors may result in EAB 200 varying the encryption of a scheduled message based on the size of the message, the importance of the message (which may be established by the creator or intended recipient of the message, for example), the source of the message (e.g., being a public figure or government official), present or predicted demands on storage (e.g., memory resources of wireless communications network 104), and marketing (e.g., fulfillment of vows or assurances for message security made by wireless communications network 104), just to name a few examples. In some embodiments, a determination by EAB 200 may lead to a case where no encryption is applied to the message. For example, if the message is to be delivered after a relatively small storage time or if security of the contents of the message is considered to be relatively unimportant, then the message need not be encrypted. In other embodiments, EAB 200 may vary the encryption based on instructions arising from a preference or selection of the intended recipient of the scheduled message.

Figure 3:
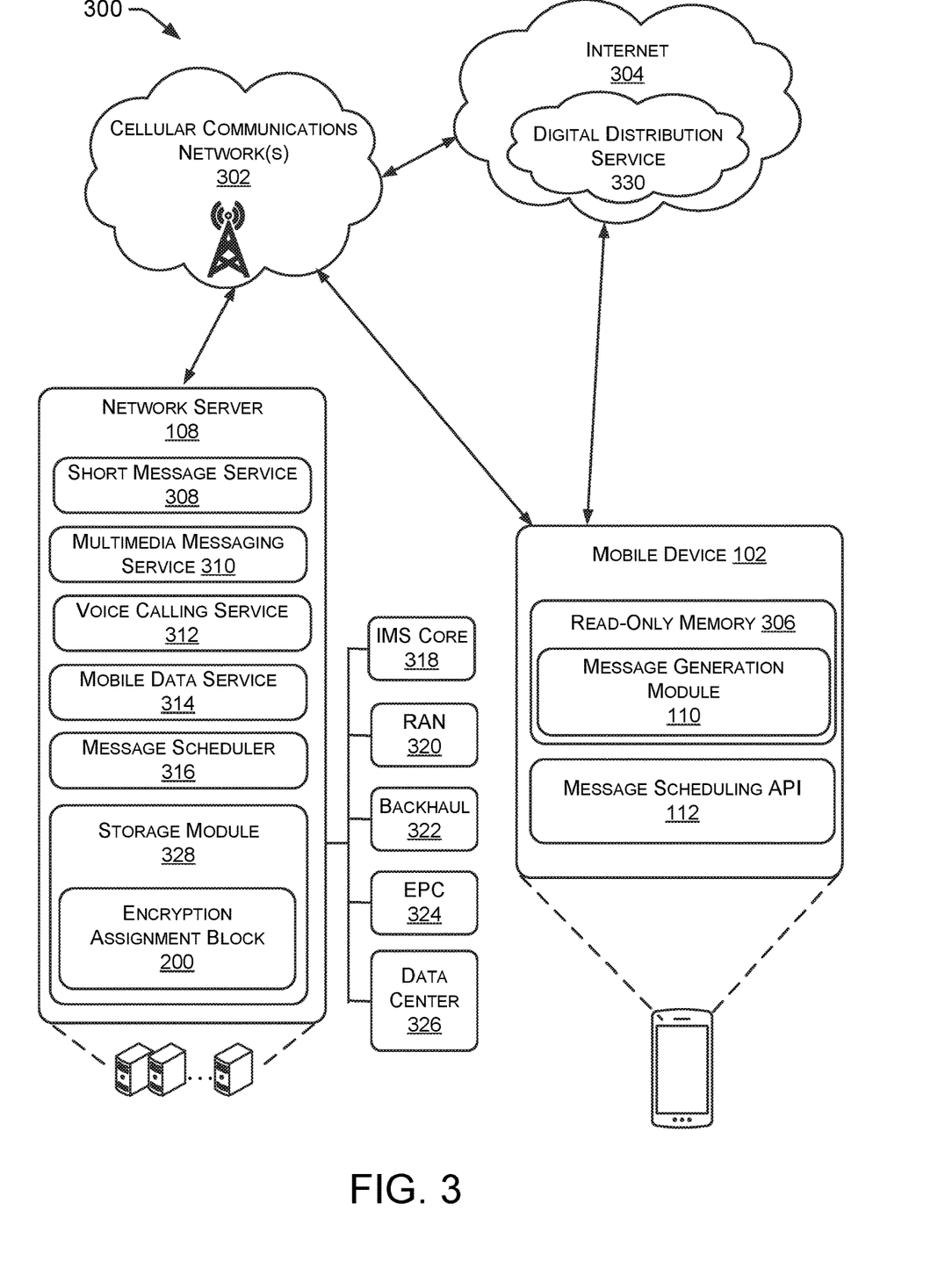
FIG. 3 schematically illustrates a system that includes a cellular communications network and the Internet, according to various embodiments.

FIG. 3 schematically illustrates a system 300 that includes cellular communications network(s) 302 and the Internet 304, according to various embodiments. System 300 provides an environment for a remote device, such as sending mobile device 102 (hereinafter, "mobile device 102") to send an encrypted scheduled message to receiving mobile device 106. Cellular communication network(s) 302 (e.g., "network 302") may include one or more cellular services providers, such as T-Mobile®, Verizon Wireless®, AT&T®, etc. Cellular communication network 302 may be the same as or similar to wireless communication network 104, illustrated in FIG. 1. Mobile device 102 may communicate with one or more other electronic devices and/or systems via network 302. As described above, mobile device 102 may include message generation module 110 and message scheduling API 112, which may reside in a read-only memory 306 of mobile device 102.

Network server 108, introduced in FIG. 1, may comprise one or more servers and may provide operational equipment and infrastructure management in support of network 302. Network server 108 may provide back-end delivery and support of cellular network services including, for example, a short message service (SMS) 308, a multimedia messaging service (MMS) 310, a voice calling service 312, a mobile data service 314, and a message scheduler 316.

Network server 108 may include and/or communicate with various types of operational equipment that support the cellular communications network, such as servers, routers, firewalls, hubs, switches, and so forth. Many of the operational equipment elements communicate over a non-cellular IP (Internet Protocol) network for purposes of control and reporting. Functions of network server 108 may be facilitated by, for example, an IMS (IP Multimedia Subsystem) Core 318, a RAN (Radio Access Network) 320, a Backhaul 322, an EPC (Evolved Packet Core) 324, and a data center 326, which may include memory resources for storing scheduled messages waiting to be delivered. System 300 may include multiple instances of any of the illustrated network elements 318-326 and/or other elements that are not shown. System 300 may be distributed over a very large region, such as over an entire country or a portion of a country. System 300 may implement a GSM (global system for mobile communications) network, as one example.

Message scheduler 316, which may reside in network server 108, as illustrated, may include clock and calendar functions to be used to compare present time with scheduled times of schedule messages being stored in data center 326, for example. Network server 108 may include a storage module 328 that manages storage of scheduled messages and may (but need not) utilize data center 326 for storage functions. Storage module 328, which may include memory resources apart from data center 326, may include EAB 200, introduce in FIG. 2.

System 300 may include at least portions of the Internet 304, such as those portions (e.g., the Cloud) that include (mobile) applications executed in response to communication with mobile device 102. Internet 304 may include a digital distribution service (DDS) 330 that procures mobile applications, such as an on-line digital store. For example, DDS 330 may sell, share, or distribute any number of applications that may be downloaded to mobile device 102, such as all or portions of message generation module 110 or message scheduling API 112. In some embodiments, DDS 330 may include processors that execute applications (e.g., in the Cloud) during engagement with mobile device 102, which may execute an associated application residing in mobile device 102. For example, mobile device 102, hosting message generation module 110 and message scheduling API 112 in a read-only memory 306, may utilize data storage and computing by servers in the Cloud.

Mobile device 102 may be configured to communicate on network 302 using network services 310-316, depicted with respect to network server 308. Accordingly, mobile device 102 may also include hardware and software supporting communications services such as a SMS, a MMS, a voice calling service, and a mobile data service, among other wireless access technologies. For example, wireless access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of wireless access technology.

Although various elements of FIG. 3 are shown and described as being discrete devices or components for purposes of discussion, any of the illustrated computing elements may, in practice, include one or more physical, virtual, or otherwise abstracted cluster or network of machines and/or devices. For example, although network server 308 may be depicted as a single entity, it may comprise any one or more computing devices, including physical devices and virtual computing units, and including network-based devices that are commonly referred to as being in the cloud. Moreover, although a single mobile device (mobile device 102) is depicted, it should be appreciated that system 300 may include any number and types of mobile devices, and of such devices, mobile device 102 is merely a singular non-limiting example.

Figure 4:
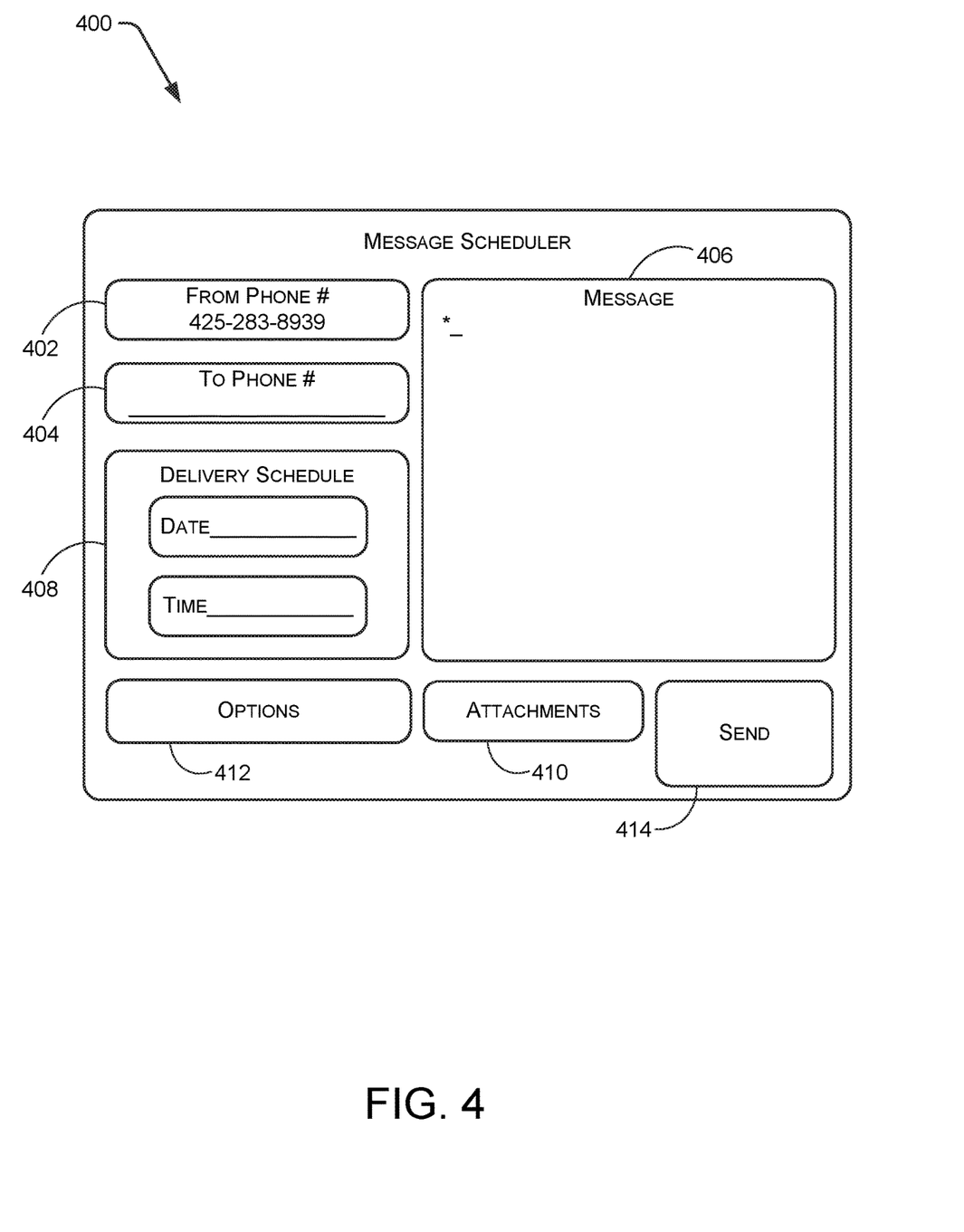
FIG. 4 represents an example display of an application programming interface for generating a scheduled message, according to some embodiments.

FIG. 4 represents an example display 400 of message scheduling API 112 for generating a scheduled message, according to some embodiments. Display 400 includes field 402 that identifies the phone number associated with the mobile device (or other computing device) used to generate the scheduled message. Field 404 prompts a user of the mobile device for the phone number of the device(s) to where the scheduled message is to be sent. In some implementations, more than one phone number (e.g., more than one recipient) can be identified. In other words, the user may send the scheduled message to more than one recipient. Field 406 may be a text-editable field for entering text for the scheduled message. Field 408 prompts the user for the delivery date and time. In some implementations, a holiday or other calendar event can be entered in field 408. For example, Christmas or other holiday, a birthday, or an anniversary can be selected or entered in field 408 as the day for delivery of the scheduled message. In some embodiments, delivery time may be automatically populated into field 408 based on a calendar of events residing in a memory of the mobile device. For example, a calendar of the user may be annotated with holidays, birthdays, or anniversaries. Message scheduling API 112 may assess such annotations of the calendar and automatically generate a scheduled message. For a particular example, the calendar may be annotated to mark January 17 as a birthday for Alexis. Accordingly, API 112 may automatically generate a message with the text "Happy Birthday Alexis!" to be scheduled for delivery on the next (and subsequent) January 17.

Field 410 may prompt the user to add various types of attachments, such as photos, videos, MP3s, files, or web links, just to name a few examples. Field 412 may provide the user with various options, such as whether the user wants to require a response from an intended recipient prior to sending the scheduled message, whether the user wants a delivery receipt, whether the user wants additional encryption applied to the scheduled message (which may result in an added cost posed by wireless communications network 104), and so on. Another option may be that a notification of the existence of the impending scheduled message is sent (at the scheduled time) to the intended recipient prior to transmitting the message to the recipient. In this case, the scheduled message is sent (at the scheduled time) only after the user or network server 108 receives permission from the intended recipient. Finally, button 414 prompts the user to send the scheduled message.

Figure 5:
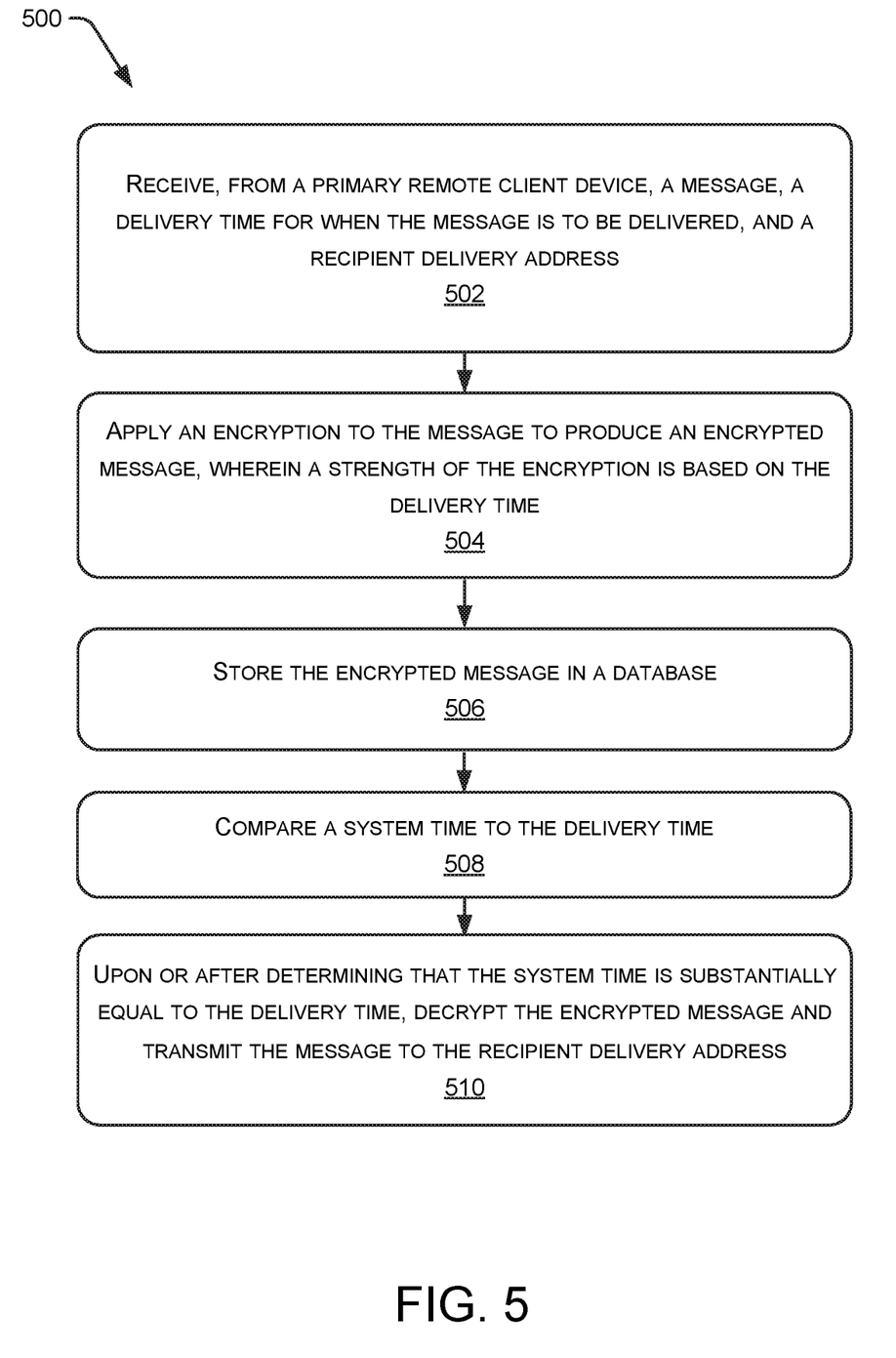
FIG. 5 is a flow diagram of a process of scheduled message delivery, according to some embodiments.

FIG. 5 is a flow diagram of a process 500 of scheduled message delivery, according to some embodiments. In some examples, process 500 may be performed by network server 108 of wireless communications network 104. In other examples, process may be performed by sending mobile device 102.

The implementation of the various components described herein is a matter of choice dependent on the performance and other requirements of computing system involved. Accordingly, logical operations described herein may be referred to variously as operations, structural devices, acts, processes, or modules. These operations, structural devices, acts, processes, and modules can be implemented in software, in firmware, in special purpose digital logic, and any combination thereof. More or fewer operations can be performed than shown in the figures and described herein. These operations can also be performed in parallel, or in a different order than described herein. Some or all of these operations might also be performed by components other than those specifically identified. As mentioned above, process 500 may be performed in part by network server 108 or sending mobile device 102. In the example illustrated below, network server 108 is considered to be performing process 500, though claimed subject matter is not so limited.

At 502, network server 108 may receive, from a primary remote client device (e.g., sending mobile device 102), a message, a delivery time for when the message is to be delivered, and a recipient delivery address. For example, the message may be created by a user of the primary remote client device in field 406 of display 400, the delivery time for when the message is to be delivered may be selected by the user using field 408, and the recipient delivery address may be selected or entered in field 404. The recipient delivery address may be represented by a phone number, which may be in a contacts database (e.g., an address book) on the primary remote client device. In some implementations, as described above, the delivery time for when the message is to be delivered is defined by a calendar date and time of day, or a holiday or personal event of a user associated with the recipient delivery address. In other implementations, the delivery time is based, at least in part, on a calendar event stored on the primary remote client device.

At 504, network server 108 may apply an encryption to the message, wherein a strength of the encryption is based on the delivery time or storage time. In some implementations, the strength of the encryption is further based on instructions provided by the primary remote client device. For example, the user may request an option in field 412 for additional encryption (in addition to what network server 108 would otherwise apply to the scheduled message) to be applied to the scheduled message. In some implementations, the strength of the encryption is further based on instructions provided by a remote client device corresponding to the recipient delivery address. For example, the intended recipient of the scheduled message may want to have additional encryption applied to the scheduled message. For a particular example, the scheduled message may include information regarding medical details of a patient, banking details, or other sensitive information. As mentioned above, the sender may have the option to request additional encryption, but this may also be the case for the intended recipient of the scheduled message.

At 506, network server 108 may store the encrypted message in a database, such as data center 326. At 508, network server 108 may compare a system time to the delivery time. In some implementations, an XML document management system (XDMS) may be used to compare the system time to the delivery time. The XDMS may comprise one or more processors of network server 108, for example.

At 510, network server 108 may, upon or after determining that the system time is substantially equal to the delivery time, decrypt the encrypted message and transmit the message to the recipient delivery address. In some implementations, prior to transmitting the message to the recipient delivery address, network server 108 may transmit a notification to the recipient delivery address. In this case, the network server may receive, from a remote client device corresponding to the recipient delivery address, permission to transmit the message to the recipient delivery address.

Figure 6:
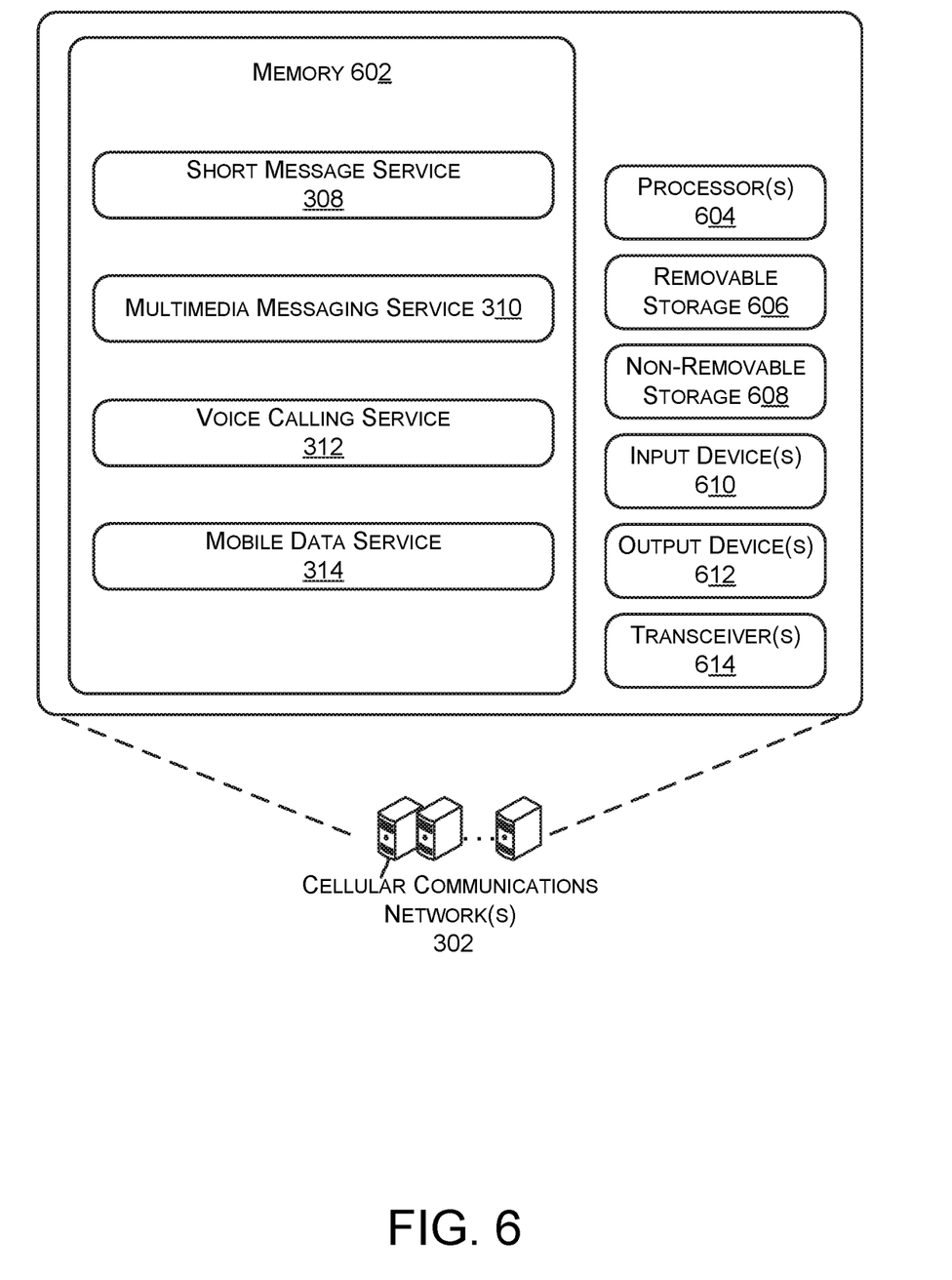
FIG. 6 is a block diagram of a network server, according to various embodiments.

FIG. 6 is a block diagram of network server 108 of a network 302, first illustrated in FIG. 3, configured to operate with mobile device 102 that includes message generation module 110 and message scheduling API 112 residing on mobile device 102, according to various embodiments. For example, network 202 may be used to implement the various operations described herein. Network 302 may be implemented as a single device or as a plurality of devices with modules and data distributed among them. Network 302 may include memory 602 storing executable code and data for SMS 308, MMS 310, voice calling service 312, and mobile data service 314, as described herein. Network 302 includes one or more processor(s) 604, a removable storage 606, a non-removable storage 608, input device(s) 610, output device(s) 612, and transceiver(s) 614.

In various embodiments, memory 602 may be volatile (such as RAM), non-volatile (such as ROM, flash memory, etc.), or some combination thereof. SMS 308, MMS 310, voice calling service 312, and mobile data service 314 may comprise methods, threads, processes, applications, or any other sort of executable instructions. SMS 308, MMS 310, voice calling service 312, and mobile data service 314 may also include files and databases (not illustrated) storing values associated with expected or nominal settings, values, etc., for the various services described. Various details of SMS 308, MMS 310, voice calling service 312, and mobile data service 314 are provided above in the discussion of FIG. 3.

In some embodiments, one or more processor(s) 604 are central processing units (CPUs), graphics processing units (GPUs), or both CPU and GPU, or other processing units or components known in the art.

Network(s) 302 may include additional data storage devices (removable and/or non-removable) such as, for example, magnetic disks, optical disks, or tape. Such additional storage is illustrated in FIG. 6 by removable storage 606 and non-removable storage 608. Tangible computer-readable media can include volatile and non-volatile, removable and non-removable media implemented in any method or technology for storage of information, such as computer readable instructions, data structures, program modules, or other data. Memory 602, removable storage 606, and non-removable storage 608 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by network 302. Any such tangible computer-readable media can be part of network 302.

Network 302 also can include input device(s) 610 such as a keypad, a cursor control, a touch-sensitive display, voice input device, etc., and output device(s) 612 such as a display, speakers, printers, haptic feedback, etc.

As illustrated in FIG. 6, network 302 may also include one or more wired or wireless transceiver(s) 614. Transceiver(s) 614 can include a network interface card (NIC), a network adapter, a LAN adapter, or a physical, virtual, or logical address to connect to cellular network(s), Wi-Fi network(s), OEM server(s), and mobile devices 102 and 106, for example. To increase throughput when exchanging wireless data, transceiver(s) 614 can utilize multiple-input/multiple-output (MIMO) technology. Transceiver(s) 614 may embody any sort of wireless transceiver device capable of engaging in wireless, radio frequency (RF) communication. Transceiver(s) 614 may also include other wireless modems, such as a modem for engaging in Wi-Fi, WiMAX, Bluetooth, or infrared communication.

Figure 7:
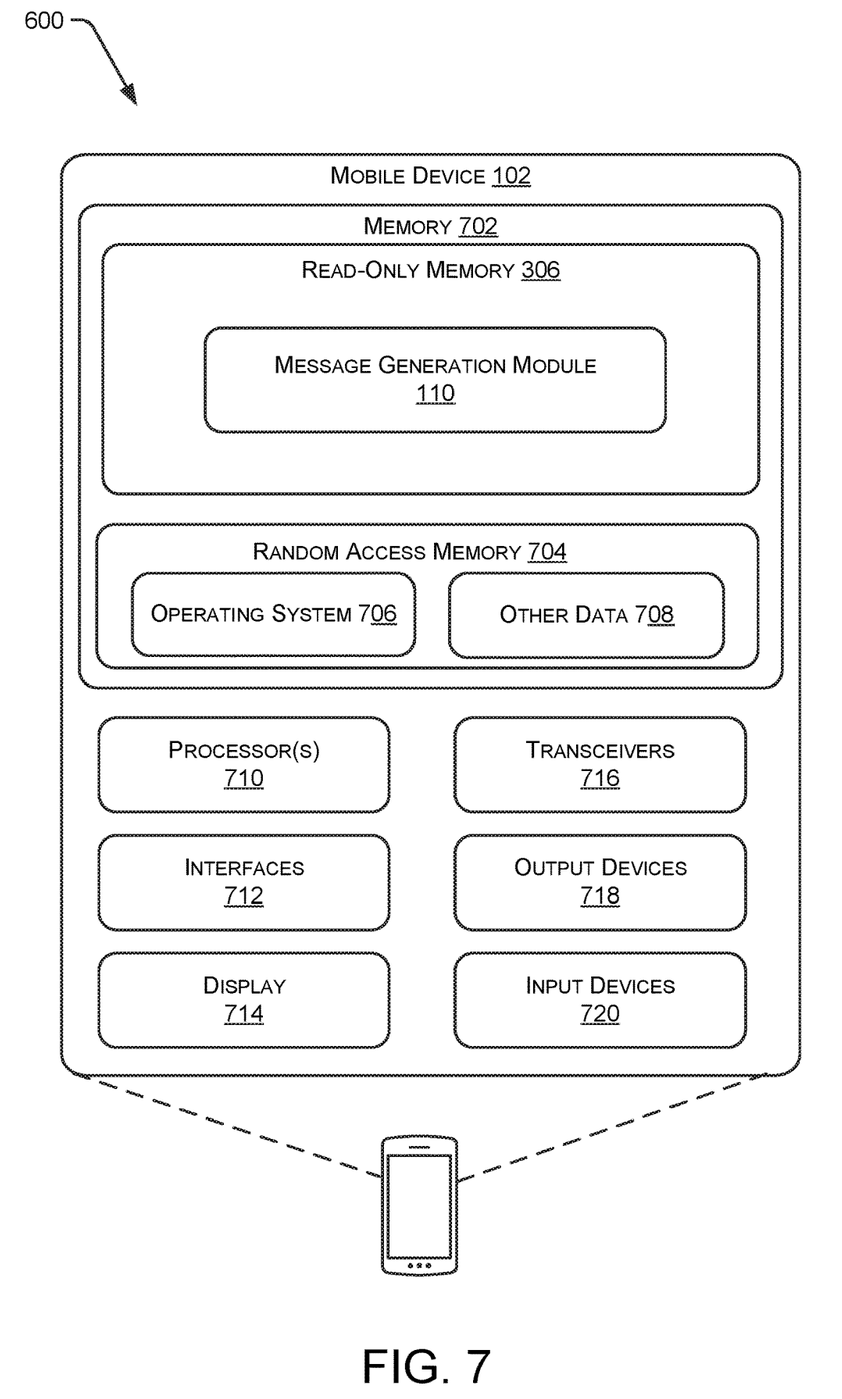
FIG. 7 is a block diagram of a mobile device, according to various embodiments.

FIG. 7 is a block diagram of (sending) mobile device 102 and illustrates a component level view of mobile device 102 configured with message generation module 110, according to various embodiments. Mobile device 102 may include a system memory 702 that includes ROM 306 and a RAM 704. ROM 306 may store message generation module 110, which may comprise one or more individual applications, and may operate message scheduling API 112. For example, message generation module 110 may comprise code executable by mobile device 102 to perform message scheduling or encryption processes, as described above.

In some examples, message generation module 110 may be configured to work with various services on network 302, such as, for example, a short message service (SMS), a multimedia messaging service (MMS), a voice calling service, and a mobile data service, which may communicate with and or otherwise share information with corresponding services on network 302 including SMS 308, MMS 310, voice calling service 312, and/or mobile data service 314. For example, message generation module 110 may use such services to communicate to mobile devices 104 or 106.

RAM 704 may include working memory that stores information such as an operating system 706, and other data 708. Other data 708 may include application(s) such as voice calling clients, VoLTE calling clients, Wi-Fi calling clients, messaging applications, email applications, media player applications, video calling applications, video chat applications, web browsers, social media applications, any sort of real-time communication applications, or any other sort of applications. The application(s) embodied as other data 708 may engage in communication with other applications, servers, or devices via a communication link over a network (e.g., the cellular network(s) 202, the Internet, and/or Wi-Fi network(s), sending and receiving data packets.

ROM 306 and RAM 704 can include non-transitory computer-readable media (which may be non-volatile and volatile, respectively), and may include removable and non-removable tangible, physical media implemented in technology for storage of information, such as computer readable instructions, data structures, program modules, or other data. System memory 702 (and removable storage 606 and non-removable storage 608 as illustrated in FIG. 6) are examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by mobile device 102. Any such non-transitory computer-readable media may be part of mobile device 102, network 302, and/or other components of system 300.

Mobile device 102 may further include processor(s) 710 which, in some implementations, may be one or more central processing units (CPUs), graphics processing units (GPUs), or both CPUs and GPUs, or any other sort of processing unit.

Mobile device 102 may further include one or more interfaces 712, a display 714, transceivers 716, output device(s) 718, and input device(s) 720. In some implementations, transceivers 716 may include radios and/or modems, or combinations thereof known in the art. For example, transceivers 716 may include one or more radio transceivers that performs the function of transmitting and receiving radio frequency communications via an antenna (not shown). The radios and/or modems may facilitate wireless connectivity between mobile device 102 and various devices or one or more networks (e.g., 302). In addition, transceivers 716 may include a near field antenna for communicating over unlicensed wireless IP networks, such as local wireless data networks and personal area networks (e.g., Bluetooth or near field communication (NFC) networks). Further, transceivers 716 may include wired communication components, such as an Ethernet port, that connect the mobile device 102 in a wired fashion to devices of one or more networks. In various implementations, transceivers 716 may interface with and be controlled by a radio chipset (not shown).

In some implementations, output devices 718 include any sort of output devices known in the art, such as a display (e.g., a liquid crystal display), speakers, a vibrating mechanism, or a tactile feedback mechanism. Output devices 718 also include ports for one or more peripheral devices, such as headphones, peripheral speakers, or a peripheral display.

In various implementations, input device(s) 720 include any sort of input devices known in the art. For example, input device(s) 720 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A wireless communications network comprising:
one or more processors;
a non-transitory storage medium; and
instructions stored in the non-transitory storage medium, the instructions being executable by the one or more processors to:
 receive, from a primary remote client device, a message, a delivery time for when the message is to be delivered, and a recipient delivery address;
 determine, based at least in part on the delivery time, a time span for which the message is predicted to be stored in a memory;
 apply an encryption to the message to produce an encrypted message, wherein a strength of the encryption is based at least in part on exposure of the message to security risks while being stored in memory, and wherein the exposure is based at least in part on the time span;
 store the encrypted message in a database;
 compare a system time to the delivery time; and
 upon or after determining that the system time is substantially equal to the delivery time, decrypt the encrypted message and transmit the message to the recipient delivery address.

2. The wireless communications network of claim 1, wherein the instructions are further executable by the one or more processors to:
prior to transmitting the message to the recipient delivery address, transmit a notification to the recipient delivery address; and
receive, from a remote client device corresponding to the recipient delivery address, permission to transmit the message to the recipient delivery address.

3. The wireless communications network of claim 1, wherein the strength of the encryption is further based on present or predicted demands on memory resources of the wireless communications network.

4. The wireless communications network of claim 1, wherein the strength of the encryption is further based on instructions provided by the primary remote client device.

5. The wireless communications network of claim 1, wherein the strength of the encryption is further based on instructions provided by a remote client device corresponding to the recipient delivery address.

6. The wireless communications network of claim 1, wherein the delivery time for when the message is to be delivered is defined by a calendar date and time of day.

7. The wireless communications network of claim 1, wherein the delivery time for when the message is to be delivered is defined by a holiday or personal event of a user associated with the recipient delivery address.

8. The wireless communications network of claim 1, wherein the delivery time is based, at least in part, on a calendar event stored on the primary remote client device.

9. The wireless communications network of claim 1, wherein an XML document management system (XDMS) compares the system time to the delivery time, and wherein the XDMS comprises the one or more processors.

10. One or more non-transitory computer-readable media storing computer-executable instructions that, when executed by one or more processors of a network element, cause a flow controller of the network element to perform operations comprising:
receiving, from a primary remote client device, a message, a delivery time for when the message is to be delivered, and a recipient delivery address;
determining, based at least in part on the delivery time, a time span for which the message is predicted to be stored in a memory;
applying an encryption to the message to produce an encrypted message, wherein a strength of the encryption is based at least in part on exposure of the message to security risks while being stored in memory, and wherein the exposure is based at least in part on the time span;
storing the encrypted message in a database;
comparing a system time to the delivery time; and upon or after determining that the system time is substantially equal to the delivery time, decrypting the encrypted message and transmitting the message to the recipient delivery address.

11. The one or more non-transitory computer-readable media of claim 10, wherein the strength of the encryption is further based on present or predicted demands on memory resources of the network element.

12. The one or more non-transitory computer-readable media of claim 10, wherein the instructions are further executable by the one or more processors of the network element to cause the flow controller of the network element to perform a further operation comprising:
prior to transmitting the message to the recipient delivery address, transmitting a notification to the recipient delivery address; and
receiving, from a remote client device corresponding to the recipient delivery address, permission to transmit the message to the recipient delivery address.

13. The one or more non-transitory computer-readable media of claim 10, wherein the strength of the encryption is further based on instructions provided by the primary remote client device.

14. The one or more non-transitory computer-readable media of claim 10, wherein the strength of the encryption is further based on instructions provided by a remote client device corresponding to the recipient delivery address.

15. A computer-implemented method comprising:
receiving, from a primary remote client device, a message, a delivery time for when the message is to be delivered, and a recipient delivery address;
determining, based at least in part on the delivery time, a time span for which the message is predicted to be stored in a memory;
applying an encryption to the message to produce an encrypted message, wherein a strength of the encryption is based at least in part on exposure of the message to security risks while being stored in memory, and wherein the exposure is based at least in part on the time span;
storing the encrypted message in a database;
comparing a system time to the delivery time; and
upon or after determining that the system time is substantially equal to the delivery time, decrypting the encrypted message and transmitting the message to the recipient delivery address.

16. The computer-implemented method of claim 15, wherein the strength of the encryption is further based on present or predicted demands on memory resources of a wireless communications network.

17. The computer-implemented method of claim 15, further comprising:
prior to transmitting the message to the recipient delivery address, transmitting a notification to the recipient delivery address; and
receiving, from a remote client device corresponding to the recipient delivery address, permission to transmit the message to the recipient delivery address.

18. The computer-implemented method of claim 15, wherein the strength of the encryption is further based on instructions provided by the primary remote client device.

19. The computer-implemented method of claim 15, wherein the strength of the encryption is further based on instructions provided by a remote client device corresponding to the recipient delivery address.

20. The computer-implemented method of claim 15, wherein the message comprises an audio message.

* * * * *